United States Patent
Cole

(10) Patent No.: US 9,378,492 B1
(45) Date of Patent: Jun. 28, 2016

(54) SYSTEM, METHOD, AND COMPUTER PROGRAM FOR AUTOMATICALLY RESOLVING NON-SUFFICIENT FUNDS (NSF) ERRORS IN A NETWORK

(71) Applicant: Amdocs Software Systems Limited, Dublin (IE)

(72) Inventor: Mitchell Gordon Cole, Seattle, WA (US)

(73) Assignee: Amdocs Software Systems Limited, Dublin (IE)

( * ) Notice: Subject to any disclaimer, the term of this patent is extended or adjusted under 35 U.S.C. 154(b) by 1 day.

(21) Appl. No.: 14/170,399

(22) Filed: Jan. 31, 2014

Related U.S. Application Data

(60) Provisional application No. 61/818,457, filed on May 2, 2013.

(51) Int. Cl.
*G06Q 40/00* (2012.01)
*G06Q 20/22* (2012.01)

(52) U.S. Cl.
CPC .................... *G06Q 20/227* (2013.01)

(58) Field of Classification Search
USPC .......................................... 705/35, 39, 40, 38
See application file for complete search history.

(56) References Cited

U.S. PATENT DOCUMENTS

| | | | | |
|---|---|---|---|---|
| 7,115,411 | B2 * | 10/2006 | Huang | 435/253.3 |
| 7,792,748 | B1 * | 9/2010 | Ebersole | G06Q 20/10 235/379 |
| 8,275,685 | B2 * | 9/2012 | Ross et al. | 705/35 |
| 8,275,702 | B1 * | 9/2012 | Enriquez | 705/39 |
| 2006/0259390 | A1 * | 11/2006 | Rosenberger | 705/35 |
| 2007/0106558 | A1 * | 5/2007 | Mitchell et al. | 705/16 |
| 2008/0010189 | A1 * | 1/2008 | Rosenberger | 705/39 |
| 2009/0164352 | A1 * | 6/2009 | Sorbe et al. | 705/30 |
| 2009/0164382 | A1 * | 6/2009 | Sally | 705/67 |
| 2011/0261964 | A1 | 10/2011 | Kahler et al. | |
| 2012/0054093 | A1 * | 3/2012 | Schamer | G06Q 20/10 705/39 |
| 2012/0066078 | A1 * | 3/2012 | Kingston | G06Q 20/20 705/16 |
| 2012/0130786 | A1 * | 5/2012 | Marshall | G06Q 40/02 705/14.17 |

(Continued)

FOREIGN PATENT DOCUMENTS

EP    1744518 A2    1/2007

OTHER PUBLICATIONS

Fleishman, G., "How to control the keys to your cloud storage castle," TechHive, Aug. 2, 2012, pp. 1-5, retrieved from http://www.techhive.com/article/2000251/how-to-control-the-keys-to-your-cloud-storage-castle.html.

(Continued)

*Primary Examiner* — Lalita M Hamilton
(74) *Attorney, Agent, or Firm* — Zilka-Kotab, PC

(57) ABSTRACT

A system, method, and computer program product are provided for automatically resolving non-sufficient funds (NSF) errors in a network. In use, it is automatically detected that a non-sufficient funds (NSF) error has occurred in a network, the NSF error being associated with a transaction of a consumer of the network while attempting to charge a first account. Additionally, it is automatically determined that the consumer has designated at least one alternative second account. Further, it is automatically determined that at least one of the at least one alternative second account has sufficient funds to complete the transaction. Furthermore, the at least one of the at least one alternative second account is automatically charged to complete the transaction.

10 Claims, 6 Drawing Sheets

(56) References Cited

U.S. PATENT DOCUMENTS

| | | | | |
|---|---|---|---|---|
| 2012/0173413 | A1* | 7/2012 | Yoo | G06Q 20/10 705/39 |
| 2012/0246064 | A1* | 9/2012 | Balkow | G06Q 40/02 705/39 |
| 2013/0138562 | A1* | 5/2013 | Yoo | G06Q 20/10 705/44 |
| 2013/0346302 | A1* | 12/2013 | Purves | G06Q 20/102 705/40 |
| 2014/0101034 | A1* | 4/2014 | Tanner | G06Q 20/10 705/39 |
| 2014/0236840 | A1* | 8/2014 | Islam | G06Q 20/204 705/72 |
| 2015/0026049 | A1* | 1/2015 | Theurer | G06Q 20/36 705/41 |

OTHER PUBLICATIONS

Kamara, S. et al., "Cryptographic Cloud Storage," Proceedings of Financial Cryptography: Workshop on Real-Life Cryptographic Protocols and Standardization 2010, 2010, pp. 1-14, retrieved from http://research.microsoft.com/pubs/112576/crypto-cloud.pdf.

* cited by examiner

SYSTEM, METHOD, AND COMPUTER PROGRAM FOR AUTOMATICALLY RESOLVING NON-SUFFICIENT FUNDS (NSF) ERRORS IN A NETWORK

CLAIM OF PRIORITY

This application claims the benefit of U.S. Provisional Application No. 61/818,457, filed May 2, 2013, the entire contents of which are incorporated herein by reference.

FIELD OF THE INVENTION

The present invention relates to consumer service provider networks, an more particularly to generating revenue in such networks.

BACKGROUND

Service providers who engage in the sale of digital goods lose considerable revenue every month due to non-sufficient funds (NSF) on the part of the consumer. Typically, when a purchase is initiated by a consumer, a request is sent to the billing system of record to check the available balance in the consumer's account against the price of the transaction. If the available balance is less than the transaction amount, the transaction fails with an error of NSF and the potential revenue is lost. This not only causes lost revenue, it is also a sunken cost for the network operator, as each API call represents a small cost to operate.

An NSF error also adds to a consumer's indirect negative impression with the network operator, which can reduce brand loyalty and increase the risk of churn. There is thus a need for addressing these and/or other issues associated with the prior art.

SUMMARY

A system, method, and computer program product are provided for automatically resolving non-sufficient funds (NSF) errors in a network. In use, it is automatically detected that a non-sufficient funds (NSF) error has occurred in a network, the NSF error being associated with a transaction of a consumer of the network while attempting to charge a first account. Additionally, it is automatically determined that the consumer has designated at least one alternative second account. Further, it is automatically determined that at least one of the at least one alternative second account has sufficient funds to complete the transaction. Furthermore, the at least one of the at least one alternative second account is automatically charged to complete the transaction.

DETAILED DESCRIPTION

Figure 1:
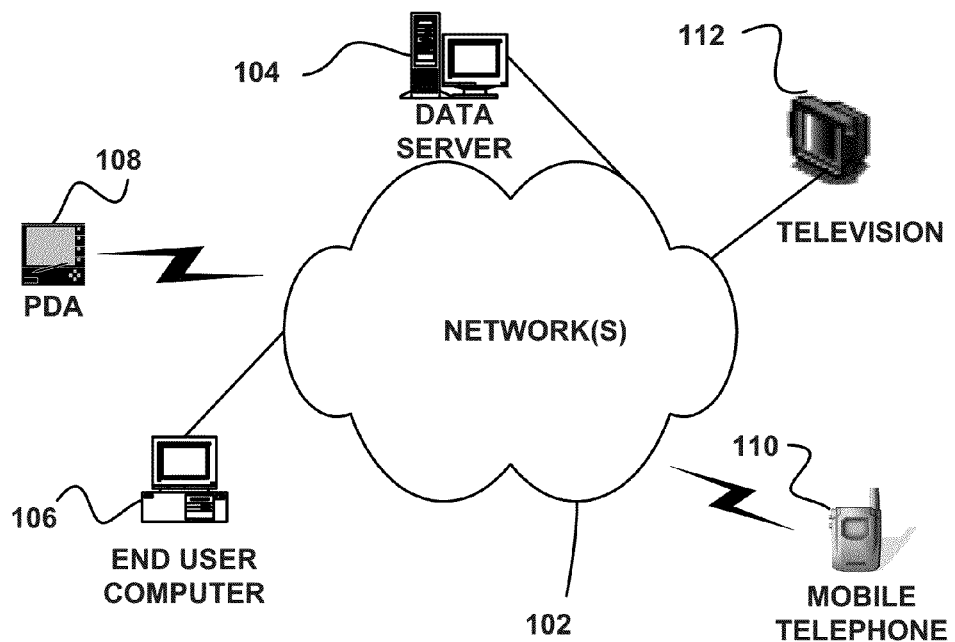
FIG. 1 illustrates a network architecture, in accordance with one possible embodiment.

FIG. 1 illustrates a network architecture 100, in accordance with one possible embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
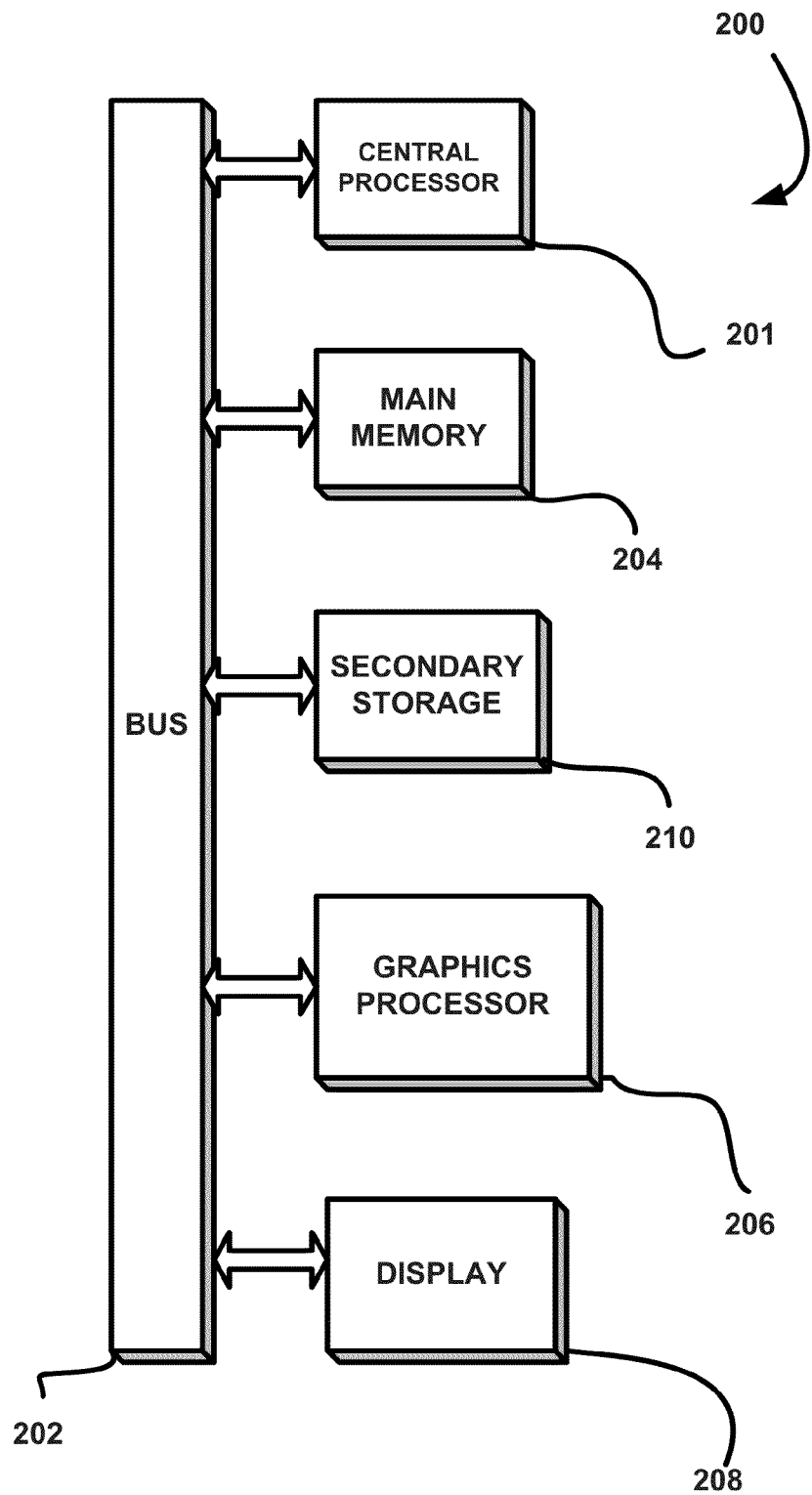
FIG. 2 illustrates an exemplary system, in accordance with one embodiment.

FIG. 2 illustrates an exemplary system 200, in accordance with one embodiment. As an option, the system 200 may be implemented in the context of any of the devices of the network architecture 100 of FIG. 1. Of course, the system 200 may be implemented in any desired environment.

As shown, a system 200 is provided including at least one central processor 201 which is connected to a communication bus 202. The system 200 also includes main memory 204 [e.g. random access memory (RAM), etc.]. The system 200 also includes a graphics processor 206 and a display 208.

The system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204, the secondary storage 210, and/or any other memory, for that matter. Such computer programs, when executed, enable the system 200 to perform various functions (to be set forth below, for example). Memory 204, storage 210 and/or any other storage are possible examples of tangible computer-readable media.

Figure 3:
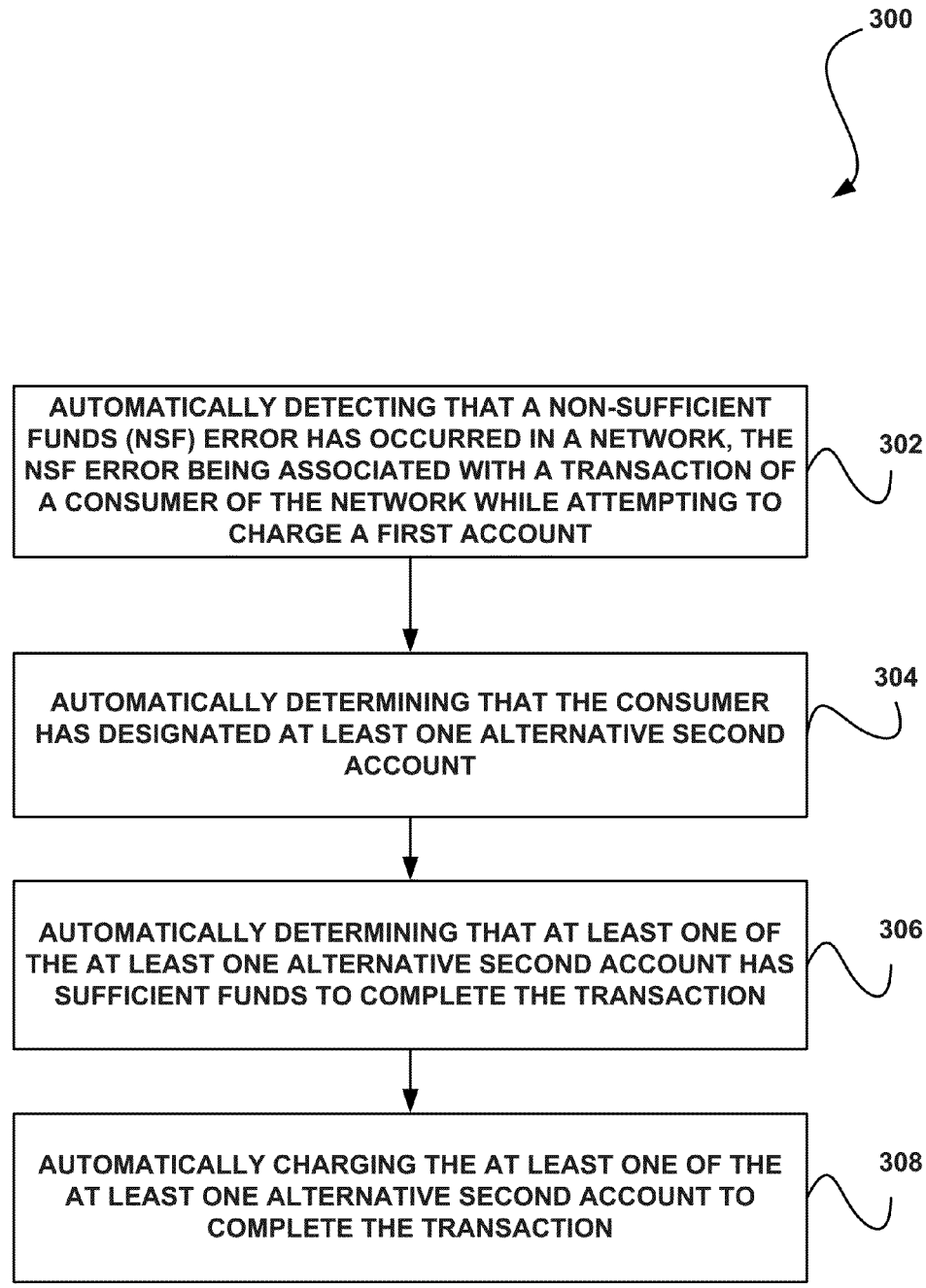
FIG. 3 illustrates a method for automatically resolving non-sufficient funds (NSF) errors in a network, in accordance with one embodiment.

FIG. 3 illustrates a method 300 for automatically resolving non-sufficient funds (NSF) errors in a network, in accordance with one embodiment. As an option, the method 300 may be carried out in the context of the details of FIGS. 1 and/or 2. Of course, however, the method 300 may be carried out in any desired environment. Further, the aforementioned definitions may equally apply to the description below.

As shown, the method 300 includes automatically detecting that a non-sufficient funds (NSF) error has occurred in a network, the NSF error being associated with a transaction of a consumer of the network while attempting to charge a first account. See operation 302. In the context of the present description, an NSF error refers to any error resulting from an unsuccessful transaction that is due to the determination that a particular payment method has non-sufficient funds.

The transaction may be associated with any product and/or service. Further, the network may include any network associated with facilitating transactions. For example, in one embodiment, the network may include a consumer telecommunications provider network.

As shown further in FIG. 3, the method 300 includes automatically determining that the consumer has designated at least one alternative second account. See operation 304. In the context of the present description, a consumer refers to any user of the network attempting to facilitate a transaction.

Further, the method 300 includes automatically determining that at least one of the at least one alternative second account has sufficient funds to complete the transaction. See operation 306. Additionally, the at least one of the at least one alternative second account is automatically charged to complete the transaction. See operation 308.

The at least one alternative second account may include one account or multiple accounts. Furthermore, the first and/or second account may include any type of payment method, including carrier billing, a credit card, a bank account, a gift card, direct withdrawal, an e-wallet application, a digital currency application, a top-up system, and/or any other payment method.

In one embodiment, the at least one alternative second account may include a hierarchy of preferred payment options. For example, the consumer may establish the hierarchy of preferred payment options (e.g. by selecting a from a list of payment options, etc.).

In one embodiment, each of the hierarchy of preferred payment options may be associated with a per transaction spending limit. In another embodiment, each of the hierarchy of preferred payment options may be associated with a monthly spending limit. For example, the consumer may set spending limits for the payment options. Further, in one embodiment, automatically determining that at least one of the at least one alternative second account has sufficient funds to complete the transaction may include checking the plurality of payment options in the hierarchical order.

In one embodiment, it may be determined that the at least one alternative second account includes a top-up system. In the context of the present description, a top-up system refers to any system capable of topping-up, or refilling a card or account, etc. In this case, in response to determining that the at least one alternative second account includes the top-up system, the top-up system may be automatically invoked to add funds to the first account. Further, the first account may be automatically charged to complete the transaction, in response to the top-up system to adding funds to the first account.

In the case the network is associated with a consumer service provider network, in one embodiment, a service provider operator associated with the consumer service provider network may be capable of establishing custom payment options associated with the at least one alternative second account. For example, the custom payment options associated with the at least one alternative second account may include direct carrier billing (DCB). In another embodiment, at least one of a service provider operator associated with the consumer service provider network or the customer may be capable of establishing a default payment option associated with the at least one alternative second account.

Still yet, in one embodiment, the method 300 may include monitoring billing traffic associated with a payment gateway of the network. The payment gateway may include any gateway associated with facilitating payments. In this case, monitoring the billing traffic associated with the payment gateway of the network may include monitoring the billing traffic for one or more NSF errors. Moreover, monitoring the billing traffic associated with the payment gateway of the network may function to automatically detect that the NSF error has occurred in the network.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
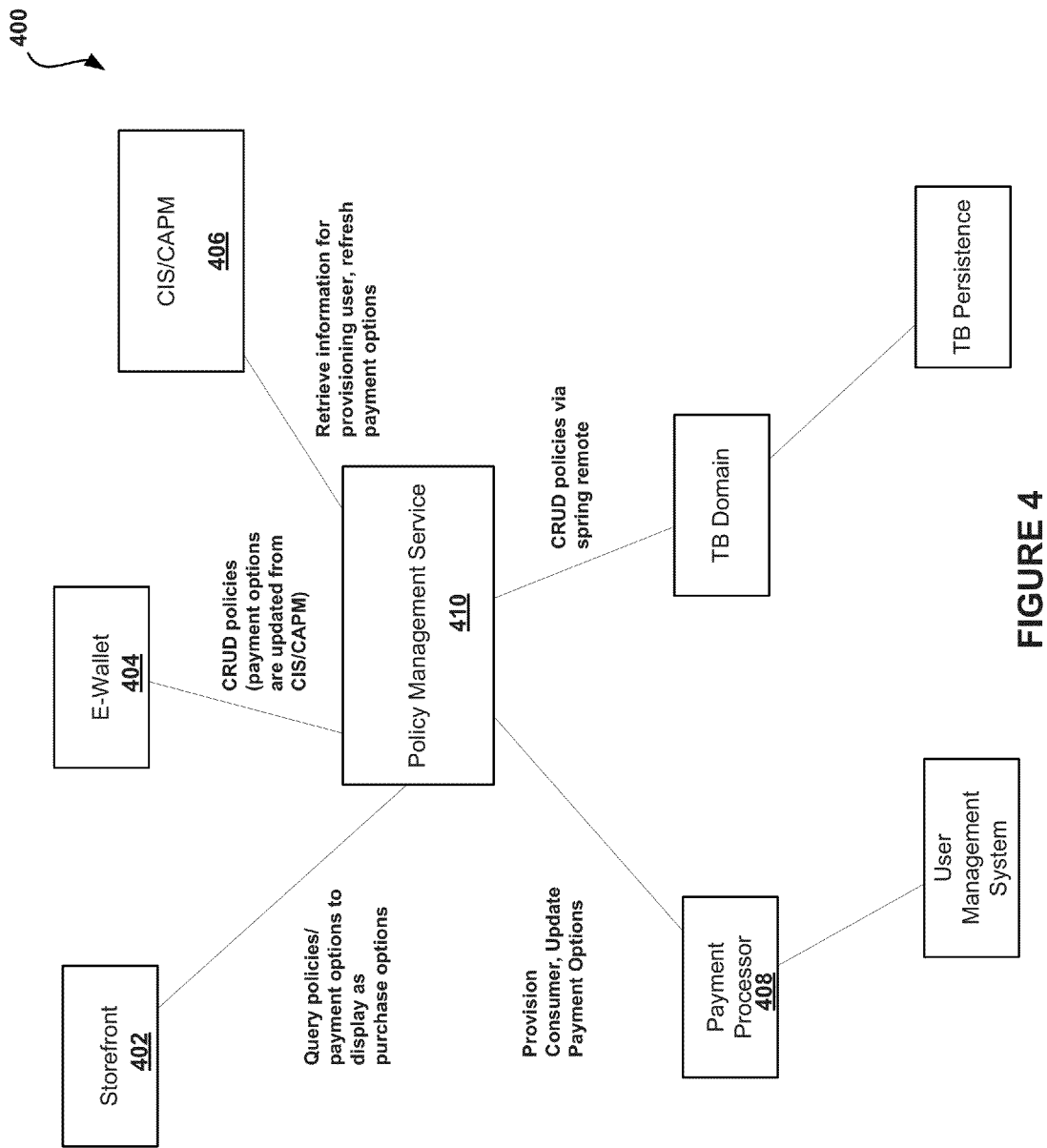
FIG. 4 illustrates a system for automatically resolving NSF errors in a network, in accordance with one embodiment.

FIG. 4 illustrates a system 400 for automatically resolving NSF errors in a network, in accordance with one embodiment. As an option, the system 400 may be implemented in the context of the details of FIGS. 1-3. Of course, however, the system 400 may be implemented in the context of any desired environment. Further, the aforementioned definitions may equally apply to the description below.

FIG. 4 shows a functional block diagram of a system 400 that functions as a transaction booster and further shows interaction with a network operator's storefront website 402, an eWallet solution 404, a customer information solution (CIS) 406, and Payment Processor 408. Using a policy engine 410 illustrated in FIG. 4, the system 400 may function to monitor all traffic to and from a payment gateway, scanning for any NSF errors.

Figure 5:
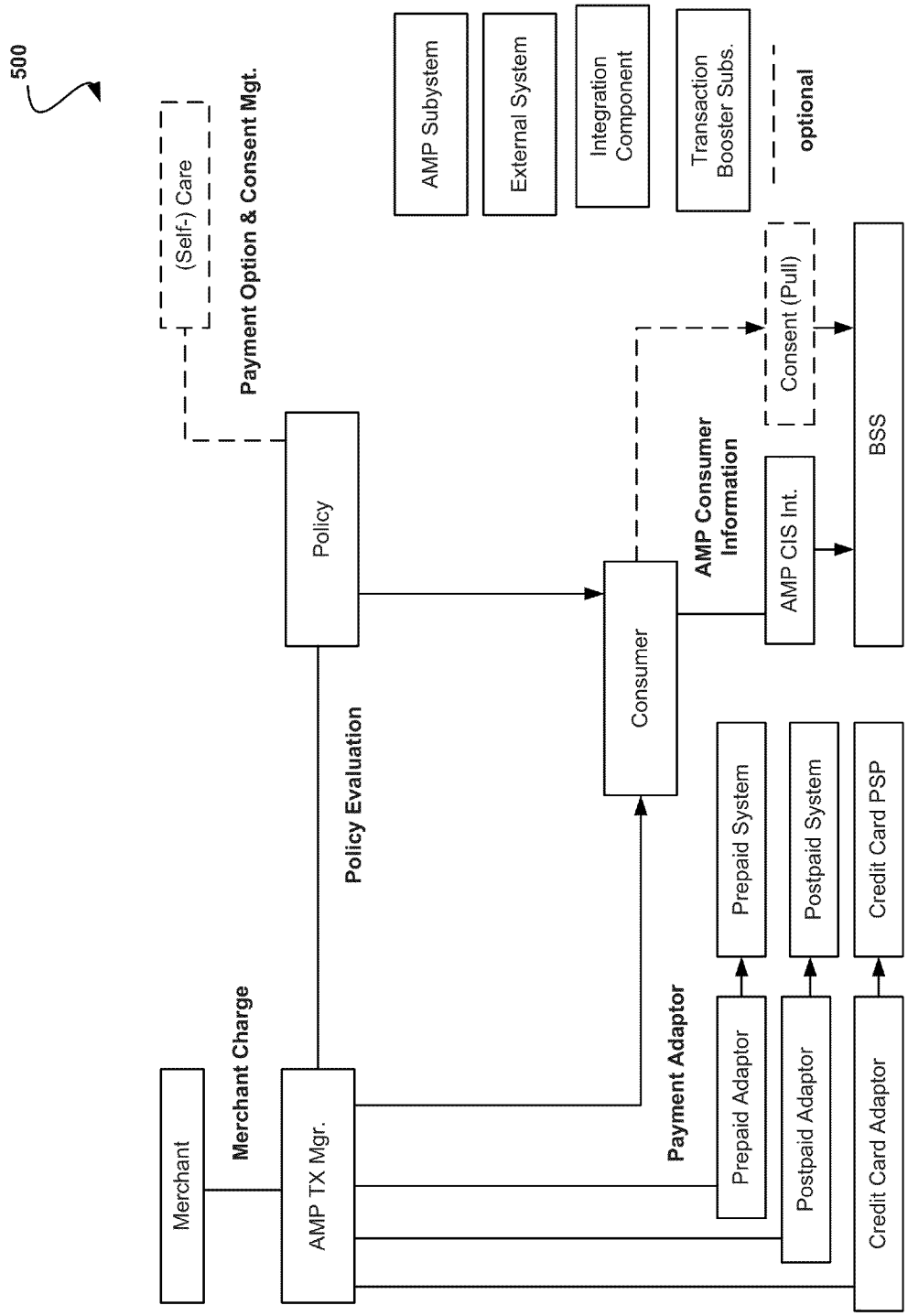
FIG. 5 illustrates a block diagram of a transaction booster system for automatically resolving NSF errors in a network, in accordance with one embodiment.

FIG. 5 illustrates a block diagram of a transaction booster system 500 for automatically resolving NSF errors in a network, in accordance with one embodiment. As an option, the system 500 may be implemented in the context of the details of FIGS. 1-4. Of course, however, the system 500 may be implemented in the context of any desired environment. Further, the aforementioned definitions may equally apply to the description below.

As shown, FIG. 5 illustrates a transaction booster deployed with a SAAS (software as a service) model billing gateway. In operation, the transaction booster system 500 may function to mitigate lost revenue damages due to NSF for service providers by consolidating payment options, such as carrier billing, credit cards, and bank accounts into one access point for subscribers.

Furthermore, in various embodiments, the subscriber may have the ability to opt into the service, set a hierarchy of preferred payment options, and/or set monthly and/or per transaction spending limits for each available payment option. In one embodiment, a graphical user interface may be presented to the user that allows the user to implement this functionality.

Additionally, service providers may have the ability to create custom payment options. In one embodiment, the service provider may have the ability to set a default payment option, such as direct carrier billing. Further, the service provider may allow for integration of a top-up system, to be added as a payment option.

In another embodiment, the service provider may set a global spending limit or per payment limit option. In addition, as an option, an interface may allow a Customer Service Representative (CSR) to receive consent from a subscriber to set all the consumer's settings on behalf of the subscriber.

Figure 6:
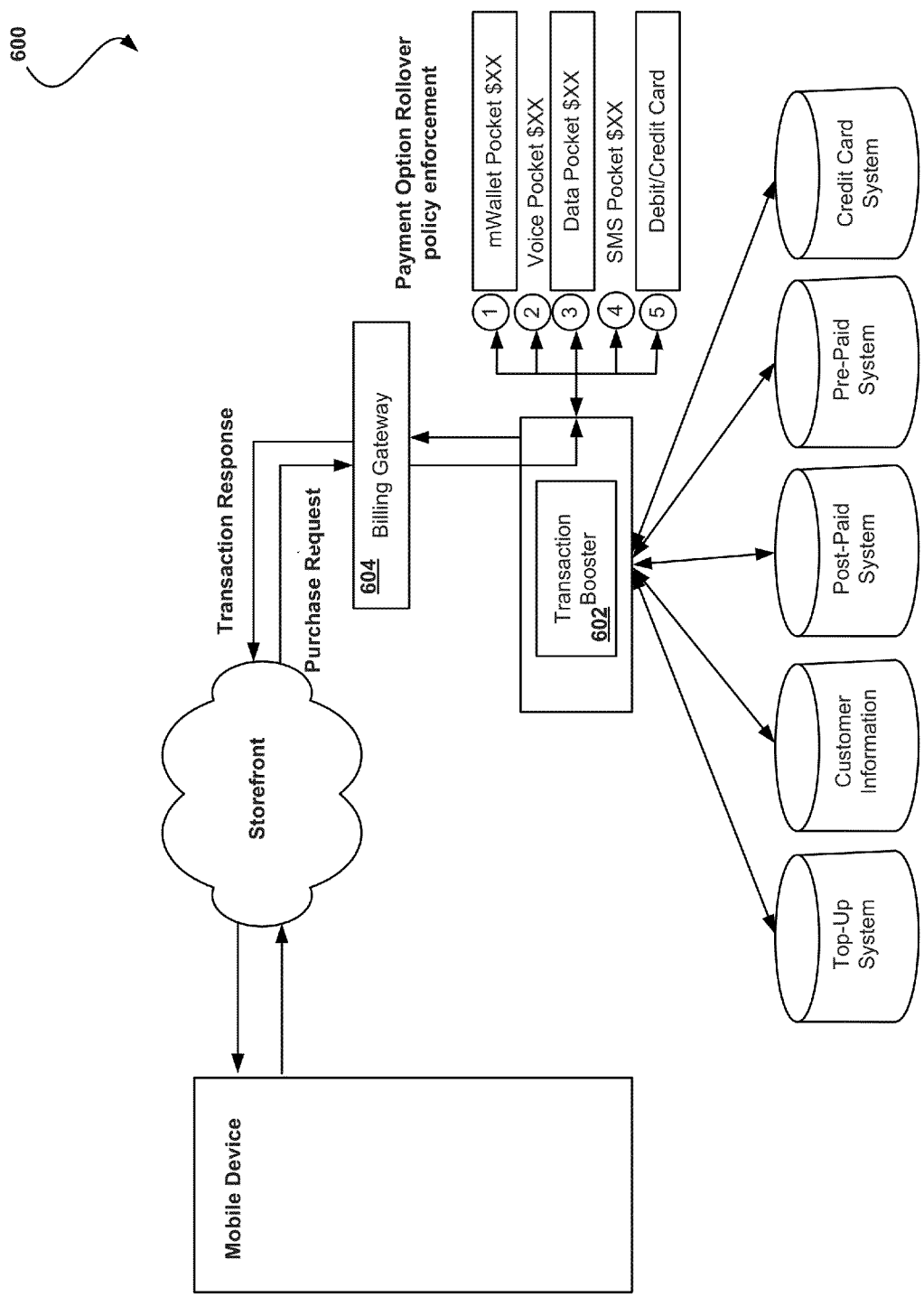
FIG. 6 illustrates a block diagram of a transaction booster system for automatically resolving NSF errors in a network, in accordance with one embodiment.

FIG. 6 illustrates a block diagram of a transaction booster system 600 for automatically resolving NSF errors in a network, in accordance with one embodiment. As an option, the system 600 may be implemented in the context of the details of FIGS. 1-5. Of course, however, the system 600 may be implemented in the context of any desired environment. Further, the aforementioned definitions may equally apply to the description below.

FIG. 6 illustrates a simplified functional block diagram of a transaction booster use case, which may include a payment option rollover in one embodiment. In operation, when an NSF error is detected, the system 600 interrupts the flow and determines if the consumer has opted into the multiple payment rollover option.

If the customer has opted-in, then a transaction booster 602 checks the transaction amount against the prioritized list of payment options such as, for example, direct carrier billing, a credit card, a bank account, and a top-up mechanism, until it finds one option having a sufficient balance. The transaction booster 602 then causes resubmission of the transaction using the new payment option and sends the completed transaction details along with a notification of change in payment option back to the merchant to display to the consumer.

In a case where a third party top-up system is selected as the preferred rollover choice, the transaction booster 602 may have a pre-defined top-up amount set by the consumer at time of provisioning, and may contact the top-up system. The top-up is then completed. Additionally, the transaction booster 602 is notified and the charge is resubmitted using the original payment option.

FIG. 6 shows the details of how the transaction booster 602 interacts and interfaces with a billing gateway 604 for monitoring NSF errors and policy enforcement, and with the service provider's network for consumer information and payment type interfaces necessary for a policy engine.

In most currently available solutions, an NSF response during a transaction would cancel the transaction and force the consumer to pay their bill, refill their account, or select a different payment option manually. Because digital transactions are impulse purchases, if there is a problem with the transaction most consumers will not retry the transaction. Thus, the techniques and systems described herein allow for an uninterrupted experience for a consumer resulting in a successful transaction.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product embodied on a non-transitory computer readable medium, comprising computer code for:
    using a payment gateway interface of a computer system to a payment gateway on a network that facilitates payments, monitoring traffic communicated over the payment gateway;
    automatically detecting, through the interface of the computer system from the monitored traffic, that a non-sufficient funds (NSF) error has occurred in the network, the NSF error being associated with a transaction of a consumer of the network while attempting to charge a first account including a direct billing account having insufficient funds;
    using a service provider interface of the computer system to a service provider system provisioning the network, accessing information of the consumer stored by the service provider system;
    automatically determining through the service provider interface of the computer system from the information of the consumer, that the consumer has designated a plurality of alternative accounts, including:
        a credit card account having both a per transaction spending limit and a monthly spending limit,
        a bank account, and
        a third party top-up system having a pre-defined top-up amount to be applied to the first account;
    responsive to the detecting that the NSFT error has occurred and the determining that the consumer has designated the plurality of alternative accounts:
        (a) interrupting, through the payment gateway interface of the computer system, a flow within the monitored traffic that is related to the transaction to prevent cancellation of the transaction otherwise resulting from the NSFT error,
        (b) upon determining that the plurality of alternative accounts includes the third party top-up system, contacting, by the computer system through a top-up interface of the computer system to the third party top-up system, the third party top-up system for funds to be added to the first account utilizing the third party top-up system,
        (c) receiving, by the computer system from the third party top-up system, a notification that the funds have been added to the first account, and
        (d) responsive to receiving the notification, automatically charging, by the computer system, the first account to complete the transaction.

2. The computer program product of claim 1, wherein the computer program product is operable such that the a plurality of alternative accounts include a hierarchy of preferred payment options.

3. The computer program product of claim 2, wherein the computer program product is operable such that the consumer establishes the hierarchy of preferred payment options.

4. The computer program product of claim 2, wherein the computer program product is operable such that each of the preferred payment options are associated with a per transaction spending limit.

5. The computer program product of claim 2, wherein the computer program product is operable such that each of the preferred payment options are associated with monthly spending limit.

6. The computer program product of claim 1, wherein the computer program product is operable such that a service provider operator associated with the service provider network is capable of establishing custom payment options associated with the plurality of alternative accounts.

7. The computer program product of claim 6, wherein the computer program product is operable such that the custom payment options associated with the plurality of alternative accounts include direct carrier billing (DCB).

8. The computer program product of claim 1, wherein the computer program product is operable such that one of a service provider operator associated with the service provider or the consumer is capable of establishing a default payment option associated with the plurality of alternative accounts.

9. A method, comprising:
    using a service provider interface of the computer system to a service provider system provisioning the network, accessing information of the consumer stored by the service provider system;
    automatically determining, through the service provider interface of the computer system from the information of the consumer, that the consumer has designated a plurality of alternative accounts, including:
        a credit card account having both a per transaction spending limit and a monthly spending limit,
        a bank account, and
        a third party top-up system having a pre-defined top-up amount to be applied to the first account;

responsive to the detecting that the NSFT error has occurred and the determining that the consumer has designated the plurality of alternative accounts;
- (a) interrupting, through the payment gateway interface of the computer system, a flow within the monitored traffic that is related to the transaction to prevent cancellation of the transaction otherwise resulting from the NSFT error,
- (b) upon determining that the plurality of alternative accounts includes the third party top-up system, contacting, by the computer system through a top-up interface of the computer system to the third party top-up system, the third part top-up system for funds to be added to the first account utilizing the third party top-up system,
- (c) receiving, by the computer system from the third party top-up system, a notification that the funds have been added to the first account, and
- (d) responsive to receiving the notification, automatically charging by the computer system, the first account to complete the transaction.

10. A system comprising:

a payment gateway interface of a computer system to a payment gateway on a network;

a service provider interface of the computer system to a service provider system provisioning the network;

a memory system of the computer system; and one or more processing cores of the computer system coupled to the memory system, the payment gateway interface, and the service provider interface, the processing cores each configured for:

using the payment gateway interface of a computer system to a payment gateway on a network that facilitates payments, monitoring traffic communicated over the payment gateway;

automatically detecting, through the interface of the computer system from the monitored traffic, that a non-sufficient funds (NSF) error has occurred in the network, the NSF error being associated with a transaction of a consumer of the network while attempting to charge a first account including a direct billing account having insufficient funds;

using the service provider interface of the computer system to a service provider system provisioning the network, accessing information of the consumer stored by the service provider system;

automatically determining, through the service provider interface of the computer system from the information of the consumer, that the consumer has designated a plurality of alternative accounts, including:
- a credit card account having both a per transaction spending limit and a monthly spending limit,
- a bank account, and
- a third party top-up system having a pre-defined top-up amount to be applied to the first account;

responsive to the detecting that the NSFT error has occurred and the determining that the consumer has designated the plurality of alternative accounts:
- (a) interrupting, through the payment gateway interface of the computer system, a flow within the monitored traffic that is related to the transaction to prevent cancellation of the transaction otherwise resulting from the NSFT error,
- (b) upon determining that the plurality of alternative accounts includes the third party top-up system, contacting, by the computer system through a top-up interface of the computer system to the third party top-up system, the third party top-up system for funds to be added to the first account utilizing the third party top-up system,
- (c) receiving, by the computer system from the third party top-up system, a notification that the funds have been added to the first account, and
- (d) responsive to receiving the notification, automatically charging by the computer system, the first account to complete the transaction.

* * * * *